United States Patent
Huang

(10) Patent No.: US 12,418,940 B2
(45) Date of Patent: Sep. 16, 2025

(54) METHODS, APPARATUS AND SYSTEMS FOR PERFORMING A RANDOM ACCESS PROCEDURE IN A WIRELESS COMMUNICATION

(71) Applicant: ZTE Corporation, Shenzhen (CN)

(72) Inventor: He Huang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 18/666,172

(22) Filed: May 16, 2024

(65) Prior Publication Data

US 2024/0407007 A1 Dec. 5, 2024

Related U.S. Application Data

(63) Continuation of application No. 17/539,717, filed on Dec. 1, 2021, now Pat. No. 12,022,525, which is a continuation of application No. 17/214,039, filed on Mar. 26, 2021, now Pat. No. 11,229,062, which is a continuation of application No. PCT/CN2018/107998, filed on Sep. 27, 2018.

(51) Int. Cl.
*H04W 72/04* (2023.01)
*H04W 74/00* (2009.01)
*H04W 74/0833* (2024.01)
*H04W 74/0836* (2024.01)

(52) U.S. Cl.
CPC ..... *H04W 74/0833* (2013.01); *H04W 74/002* (2013.01); *H04W 74/0836* (2024.01)

(58) Field of Classification Search
CPC .......... H04W 74/0833; H04W 74/002; H04W 74/0836
See application file for complete search history.

(56) References Cited

U.S. PATENT DOCUMENTS

| | | | |
|---|---|---|---|
| 2018/0097591 A1 | 4/2018 | Islam et al. | |
| 2018/0199314 A1* | 7/2018 | Takeda | H04L 1/1822 |
| 2019/0174571 A1* | 6/2019 | Deenoo | H04W 68/02 |
| 2019/0320467 A1* | 10/2019 | Freda | H04W 74/004 |

(Continued)

FOREIGN PATENT DOCUMENTS

| | | |
|---|---|---|
| CN | 108271275 A | 7/2018 |
| JP | 2017189126 | 9/2017 |
| WO | WO2018062925 A1 | 4/2018 |

OTHER PUBLICATIONS

International Search Report and English translation and Written Opinion regarding PCT/CN2018/107998 dated Jun. 27, 2019, 6 pages.

(Continued)

*Primary Examiner* — Mahbubul Bar Chowdhury
(74) *Attorney, Agent, or Firm* — Crowell & Moring LLP

(57) ABSTRACT

Methods, apparatus and systems for performing a random access procedure in a wireless communication are disclosed. In one embodiment, a method performed by a wireless communication node is disclosed. The method comprises: receiving, from a wireless communication device, a first message comprising a preamble and a payload for an access to the wireless communication node; and transmitting, to the wireless communication device, a second message in response to the first message.

17 Claims, 12 Drawing Sheets

(56) References Cited

U.S. PATENT DOCUMENTS

| | | | | |
|---|---|---|---|---|
| 2019/0342912 | A1* | 11/2019 | Priyanto | H04W 72/046 |
| 2020/0045650 | A1* | 2/2020 | Suzuki | H04W 52/22 |
| 2020/0100297 | A1 | 3/2020 | Agiwal et al. | |
| 2020/0107377 | A1 | 4/2020 | Lee et al. | |
| 2020/0221503 | A1* | 7/2020 | Kusashima | H04W 74/0836 |

OTHER PUBLICATIONS

Extended European Search Report regarding EP18929964 dated Sep. 26, 2021, 8 pages.
Chinese Office Action with English translation regarding 201880098207 .3 dated Aug. 17, 2022, 26 pages.
Indian Examination Report regarding 202117013054 dated Nov. 3, 2022, 7 pages.
EPC Communication pursuant to Article 94(3) EPC regarding Application No. 18 929 964.7 dated Nov. 16, 2022, 5 pages.
Extended European Search Report regarding EP 23 15 3928 dated Mar. 9, 2023, 7 pages.
Interdigital Communications, "Random Access Procedure," 3GPP TSG-RAN WG1 #87 R1-1612311, Reno, NV, Nov. 18, 2016, 4 pages.
Ericsson, "Random access for NR-U," 3rd Generation Partnership Project, Montreal, Canada, Jul. 1, 2018, 5 pages. Retrieved from the Internet: URL:http://www.3gpp.org/ftp/Meetings%5F3GPP%5FSYNC/RAN2/Docs.
Mediatek Inc., "Enhancements to the RACH 1-15 procedure for NR-U," Gothenburg, Sweden, August 24, 2018, 4 pages. Retrieved from the Internet: URL:http://www.3gpp.org/ftp/Meetings%5F3GPP%5FSYNC/RAN2/Docs.
Mediatek Inc, "Enhancements to the RACH procedure for NR-U," 3GPP Draft, R2-1812343, 3rd Generation Partnership Project (3GPP), Mobile Competence Centre; 650, Route Des Lucioles, F-06921, Sophia-Antipolis Cedex, Framce, vol. RAN WG2, No. Gothenburg, Sweden, Aug. 9, 2018, 4 pages.
Samsung, "4-step RACH procedure 1-15 Discussion," 3rd Generation Partnership Project, Prague, Czechia, Aug. 20, 2017, 13 pages. Retrieved from the Internet: URL:http://www.3gpp.org/ftp/Meetings 3GPP SYNC/RANI/Docs.
Samsung, "4-step RACH procedure Discussion," 3GPP Draft; RI-1713562, 3rd Generation Partnership Project (3GPP), Mobile Competence Centre; 650, Route Des Lucioles, F-06921 Sophia-Antipolis Cedex, France, vol. RAN WGI, No. Prague, Czechia, Aug. 20, 2017, 13 pages.
InterDigital Communications, 3GPP TSG-RAN WG1 #87, R1-1612311, "Random Access Procedure," dated Nov. 5, 2017, 4 pages.
3GPP TSG RAN WG1 AH_NR Meeting, R1-1700105, ZTE, "2-step Random Access Procedure," dated Jan. 10, 2017, 9 pages.
Motorola Mobility, "Physical channel design for 2-step RACH,"3GPP TSG RAN WG1 Meeting NR, R1-1700880, Spokane, Jan. 17, 2017, 5 pages.
InterDigital Communications, "2-step random access procedure," 3GPP TSG RAN WG1 AH NR Meeting, R1-1700703, Spokane, Jan. 10, 2017, 4 pages.
"3rd Generation Partnership Project; Technical Specification Group Radio Access Network," Technical Specification, Medium Access Control (MAC) protocol specification (Release 15) 3GPP TS 38.321 V15.3.0, Sep. 25, 2018, 76 pages.

* cited by examiner

METHODS, APPARATUS AND SYSTEMS FOR PERFORMING A RANDOM ACCESS PROCEDURE IN A WIRELESS COMMUNICATION

CROSS-REFERENCE TO RELATED APPLICATIONS

This application is a continuation application of U.S. application Ser. No. 17/539,717 filed on Dec. 1, 2021, which is incorporated herein by reference in its entirety. The U.S. application Ser. No. 17/539,717 is a continuation application of U.S. application Ser. No. 17/214,039 filed on Mar. 26, 2021, which is a continuation application of PCT Patent Application No. PCT/CN2018/107998, filed on Sep. 27, 2018, both of which are incorporated herein by reference in their entireties.

TECHNICAL FIELD

The disclosure relates generally to wireless communications and, more particularly, to methods, apparatus and systems for performing a random access procedure in a wireless communication.

BACKGROUND

In both the 4th Generation (4G) and the 5th Generation (5G) new radio (NR) mobile networks, before a user equipment (UE) sends data to a base station (BS), the UE needs to obtain uplink synchronization and downlink synchronization with the BS. The uplink timing synchronization may be achieved by performing a random access procedure.

An exemplary 4-step random access procedure 100 is shown in FIG. 1. As shown in FIG. 1, a UE 110 transmits a random access channel (RACH) preamble in Message 1 to a BS 120 at operation 101. Once the preamble is received successfully by the BS 120, the BS 120 will send at operation 102 a Message 2 back to the UE 110, in which a medium access control (MAC) random access response (RAR) is included as a response to the preamble. Once the MAC RAR with corresponding random access preamble (RAP) identifier (ID) is received, the UE 110 transmits Message 3 at operation 103 to the BS 120 with the grant carried in the MAC RAR. Once the Message 3 is received, the BS 120 will send the Message 4 back at operation 104 to the UE 110, in which some kind of contention resolution ID will be included for the purpose of contention resolution. A communication system merely relying on an initial access procedure as mentioned above will induce latency and cannot meet the needs of faster and newer communications in future network developments.

Thus, existing systems and methods for performing a random access procedure in a wireless communication are not entirely satisfactory.

SUMMARY OF THE INVENTION

The exemplary embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

In one embodiment, a method performed by a wireless communication node is disclosed. The method comprises: receiving, from a wireless communication device, a first message comprising a preamble and a payload for an access to the wireless communication node; and transmitting, to the wireless communication device, a second message in response to the first message.

In another embodiment, a method performed by a wireless communication device is disclosed. The method comprises: transmitting, to a wireless communication node, a first message comprising a preamble and a payload for an access to the wireless communication node; and receiving, from the wireless communication node, a second message in response to the first message.

In a different embodiment, a wireless communication node configured to carry out a disclosed method in some embodiment is disclosed. In another embodiment, a wireless communication device configured to carry out a disclosed method in some embodiment is disclosed. In yet another embodiment, a non-transitory computer-readable medium having stored thereon computer-executable instructions for carrying out a disclosed method in some embodiment is disclosed.

BRIEF DESCRIPTION OF THE DRAWINGS

Various exemplary embodiments of the present disclosure are described in detail below with reference to the following Figures. The drawings are provided for purposes of illustration only and merely depict exemplary embodiments of the present disclosure to facilitate the reader's understanding of the present disclosure. Therefore, the drawings should not be considered limiting of the breadth, scope, or applicability of the present disclosure. It should be noted that for clarity and ease of illustration these drawings are not necessarily drawn to scale.

DETAILED DESCRIPTION OF EXEMPLARY EMBODIMENTS

Figure 1:
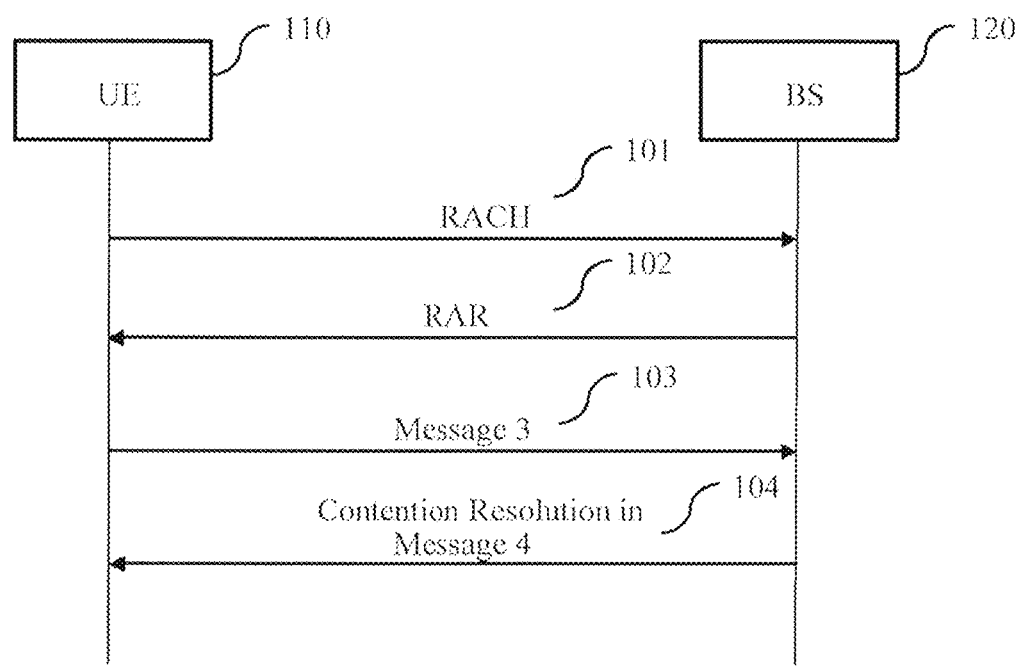
FIG. 1 illustrates an exemplary 4-step random access procedure.

Various exemplary embodiments of the present disclosure are described below with reference to the accompanying figures to enable a person of ordinary skill in the art to make and use the present disclosure. As would be apparent to those of ordinary skill in the art, after reading the present disclosure, various changes or modifications to the examples described herein can be made without departing from the scope of the present disclosure. Thus, the present disclosure is not limited to the exemplary embodiments and applications described and illustrated herein. Additionally, the specific order and/or hierarchy of steps in the methods disclosed herein are merely exemplary approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

A typical wireless communication network includes one or more base stations (typically known as a "BS") that each provides geographical radio coverage, and one or more wireless user equipment devices (typically known as a "UE") that can transmit and receive data within the radio coverage. In the wireless communication network, a BS and a UE can communicate with each other via a communication link, e.g., via a downlink radio frame from the BS to the UE or via an uplink radio frame from the UE to the BS.

The present disclosure provides methods for a terminal or a UE to complete access to a BS by a 2-step random access channel (RACH) procedure, to accelerate the entire initial access procedure and save the latency of the communication network. A 2-step RACH procedure will complete the random access in two steps. In one embodiment, the UE transmits a first message including both a preamble and a payload to the BS in a first step. The BS will then transmit a second message in response to the first message to the UE to complete the access.

In some embodiments, a mapping between a first transmission resource for the preamble and a second transmission resource for the payload is configured, and the preamble and the payload are transmitted based on the first transmission resource and the second transmission resource, respectively. In some embodiments, the mapping configuration comprises information related to at least one of the following parameters: a first number of random access channel (RACH) occasions per payload transmission occasion; a second number of preambles per payload transmission code; a third number of preamble transmission resources per payload transmission resource; a fourth number of preambles per preamble transmission resource set, wherein a preamble transmission resource set is a minimal granularity in the mapping; a fifth number of payload transmission codes per payload transmission resource set, wherein a payload transmission resource set is a minimal granularity in the mapping; and payload transmission code start index. Each of the first to fifth numbers may be an integer or a fraction.

In various embodiments, a BS may be referred to as a network side node and can include, or be implemented as, a next Generation Node B (gNB), an E-UTRAN Node B (eNB), a Transmission Reception Point (TRP), an Access Point (AP), a donor node (DN), a relay node, a core network (CN) node, a RAN node, a master node, a secondary node, a distributed unit (DU), a centralized unit (CU), etc. A UE in the present disclosure can be referred to as a terminal and can include, or be implemented as, a mobile station (MS), a station (STA), etc. A BS and a UE may be described herein as non-limiting examples of "wireless communication nodes;" and a UE may be described herein as non-limiting examples of "wireless communication devices." The BS and UE can practice the methods disclosed herein and may be capable of wireless and/or wired communications, in accordance with various embodiments of the present disclosure.

Figure 2:
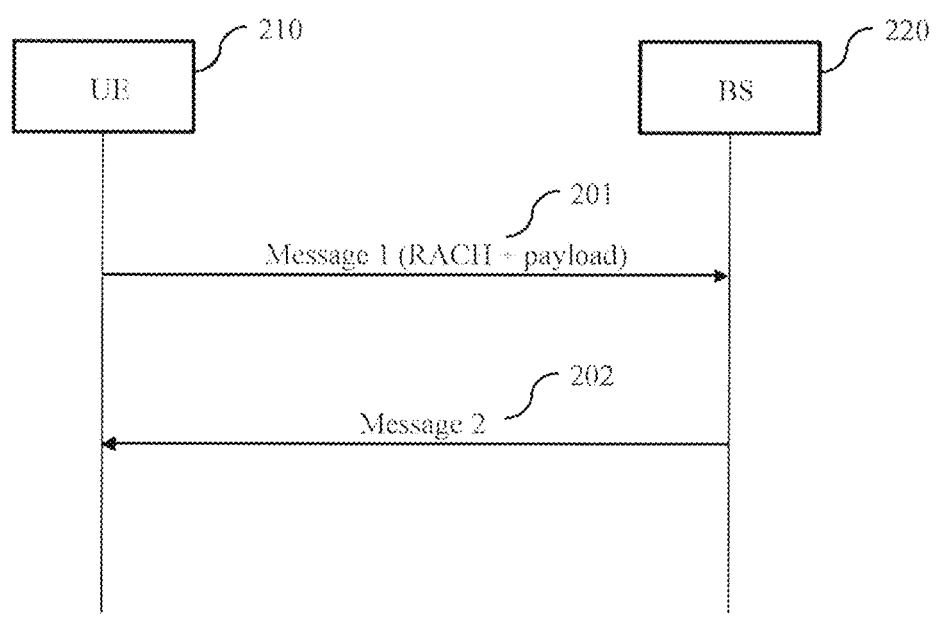
FIG. 2 illustrates an exemplary 2-step random access procedure, in accordance with some embodiments of the present disclosure.

FIG. 2 illustrates an exemplary 2-step random access procedure 200, in accordance with some embodiments of the present disclosure. A 2-step RACH procedure will complete the 4 steps in FIG. 1 in 2 messages or 2 steps. In other words, at least some content of Message 1 and Message 3 in the 4-step RACH are included in Message 1 of the 2-step RACH; and some content of the RAR and contention resolution are included in Message 2 of the 2-step RACH. As shown in FIG. 2, a UE 210 transmits, at operation 201, Message 1 that comprises both a preamble and a payload to a BS 220 for access to the BS 220. Then at operation 202, the BS 220 transmits to the UE 210 Message 2 in response to the Message 1.

Figure 3:
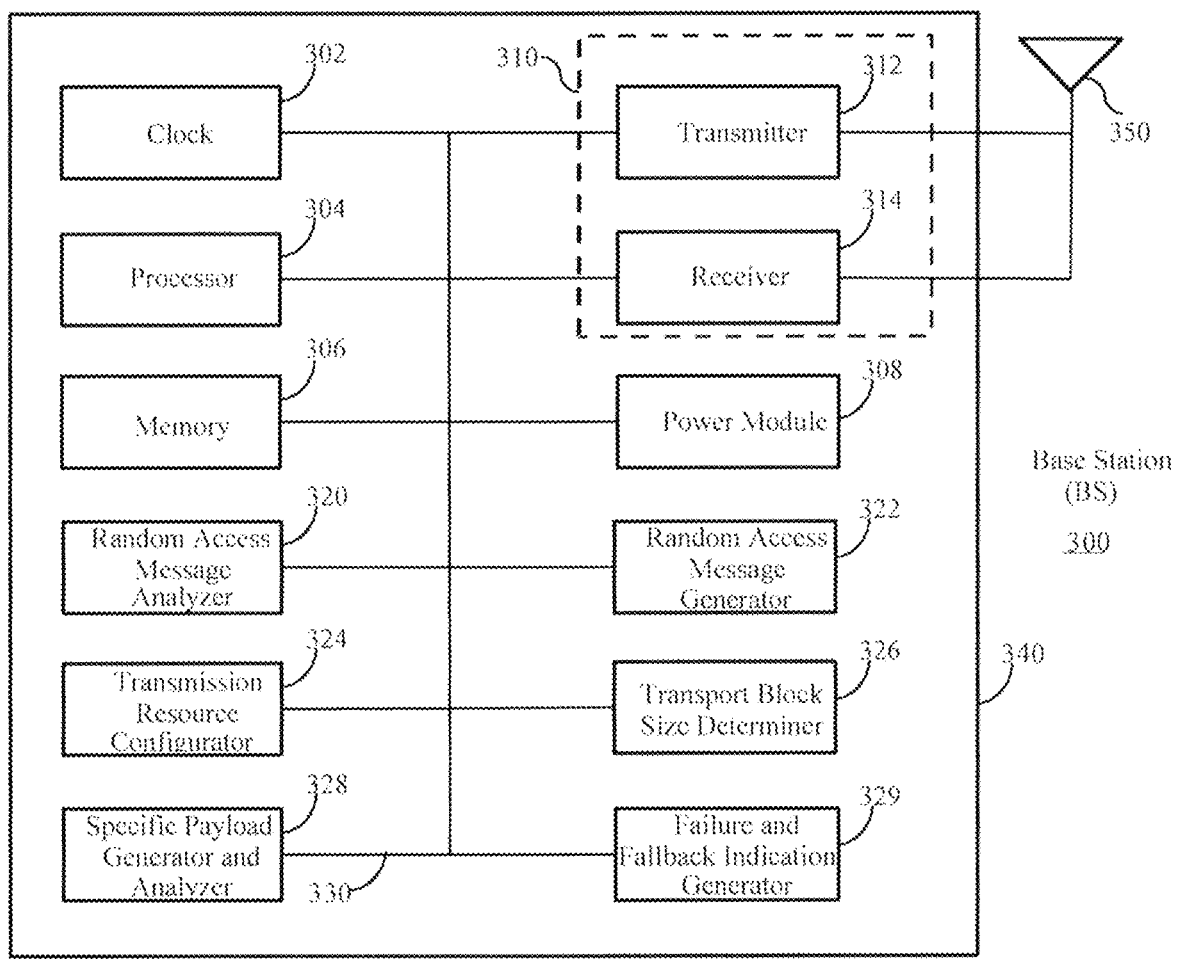
FIG. 3 illustrates a block diagram of a base station (BS), in accordance with some embodiments of the present disclosure.

FIG. 3 illustrates a block diagram of a base station (BS) 300, in accordance with some embodiments of the present disclosure. The BS 300 is an example of a node that can be configured to implement the various methods described herein. As shown in FIG. 3, the BS 300 includes a housing 340 containing a system clock 302, a processor 304, a memory 306, a transceiver 310 comprising a transmitter 312 and receiver 314, a power module 308, a random access message analyzer 320, a random access message generator 322, a transmission resource configurator 324, a transport block size determiner 326, a specific payload generator and analyzer 328, and a failure and fallback indication generator 329.

In this embodiment, the system clock 302 provides the timing signals to the processor 304 for controlling the timing of all operations of the BS 300. The processor 304 controls the general operation of the BS 300 and can include one or more processing circuits or modules such as a central processing unit (CPU) and/or any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable circuits, devices and/or structures that can perform calculations or other manipulations of data.

The memory 306, which can include both read-only memory (ROM) and random access memory (RAM), can provide instructions and data to the processor 304. A portion of the memory 306 can also include non-volatile random access memory (NVRAM). The processor 304 typically performs logical and arithmetic operations based on program instructions stored within the memory 306. The instructions (a.k.a., software) stored in the memory 306 can be executed by the processor 304 to perform the methods described herein. The processor 304 and memory 306 together form a processing system that stores and executes software. As used herein, "software" means any type of instructions, whether referred to as software, firmware, middleware, microcode, etc. which can configure a machine or device to perform one or more desired functions or processes. Instructions can include code (e.g., in source code format, binary code format, executable code format, or any other suitable format of code). The instructions, when executed by the one or more processors, cause the processing system to perform the various functions described herein.

The transceiver 310, which includes the transmitter 312 and receiver 314, allows the BS 300 to transmit and receive data to and from a remote device (e.g., another BS or a UE). An antenna 350 is typically attached to the housing 340 and electrically coupled to the transceiver 310. In various embodiments, the BS 300 includes (not shown) multiple transmitters, multiple receivers, and multiple transceivers. In one embodiment, the antenna 350 is replaced with a multi-antenna array 350 that can form a plurality of beams each of which points in a distinct direction. The transmitter 312 can be configured to wirelessly transmit packets having different packet types or functions, such packets being generated by the processor 304. Similarly, the receiver 314 is configured to receive packets having different packet types or functions, and the processor 304 is configured to process packets of a plurality of different packet types. For example, the processor 304 can be configured to determine the type of packet and to process the packet and/or fields of the packet accordingly.

In a communication system including the BS 300 that can serve one or more UEs, the BS 300 may receive a random access request from a UE for access to the BS 300. In one embodiment, the random access message analyzer 320 may receive, via the receiver 314 from the UE, a first message comprising a preamble and a payload for an access to the BS 300. The preamble and the payload are received in either a same slot or different slots based on at least one of: a pre-determined protocol and a configuration through a high-layer signaling.

In one embodiment, the UE is capable of selecting a random access (RA) procedure between a 2-step RACH and a 4-step RACH based on information related to at least one of: whether the UE supports a 2-step RACH; a comparison between a reference signal received power (RSRP) measurement result and a threshold; a comparison between a path loss and a threshold; an operation of a backoff timer; a logical channel that triggers the RA; an event that triggers the RA; a comparison between a buffer size and a threshold; a comparison between a signal to interference plus noise ratio (SINR) measurement result and a threshold; and a subscription of the UE. The random access message analyzer 320 may analyze the first message and inform the random access message generator 322 about the first message for generating a response.

In one embodiment, the random access message generator 322 may generate a second message in response to the first message. The random access message generator 322 may transmit the second message via the transmitter 312 to the UE. In one embodiment, the second message comprises a plurality of responses for a plurality of UEs. The second message may comprise information included in the first message related to at least one of the following for the UE to identify a response to the UE's first message: a contention resolution identifier (ID); a cell radio network temporary identifier (C-RNTI); an inactive-state radio network temporary identifier (I-RNTI); and a random access preamble (RAP) ID.

In one embodiment, the second message comprises information related to at least one of: a contention resolution identifier (ID); an uplink (UL) grant that comprises subsequent resources for subsequent UL transmissions; a downlink (DL) grant that comprises subsequent resources for subsequent DL transmissions; a cell radio network temporary identifier (C-RNTI); a temporary cell radio network temporary identifier (TC-RNTI), a time advance (TA) command; a backoff indicator; a fallback random access response (RAR); a retransmission indication; a negative acknowledgement (NACK) indication; and an active bandwidth part (BWP) indication. The second message may be scheduled by at least one of: a random access radio network temporary identifier (RA-RNTI); and a cell radio network temporary identifier (C-RNTI).

In one embodiment, the second message is for the UE to distinguish between a 2-step RACH and a 4-step RACH based on at least one of: a separate control resource set (CORESET) configured for transmitting the second message in the 2-step RACH compared to the 4-step RACH; a separate search space configured for transmitting the second message in the 2-step RACH compared to the 4-step RACH; a RA type indicator carried in a physical layer signaling, e.g. a RA type indicator in downlink control information (DCI) carried in physical downlink control channel (PDCCH), through which the Message 2 (Msg2) is scheduled; and a different offset added in a calculation of random access radio network temporary identifier (RA-RNTI) for transmitting the second message in the 2-step RACH compared to the 4-step RACH. An offset added in the calculation of RA-RNTI may be based on at least one of: a fixed value according to a pre-determined protocol; a configurable value configured by a high-layer signaling; and a value calculated based on a fixed value and a configurable value.

The transmission resource configurator 324 in this example may configure a mapping between a first transmission resource for the preamble and a second transmission resource for the payload. The preamble and the payload are received based on the first transmission resource and the second transmission resource, respectively. In one embodiment, configuring the mapping comprises configuring information related to at least one of the following parameters: a first number of random access channel (RACH) occasions per payload transmission occasion; a second number of preambles per payload transmission code; a third number of preamble transmission resources per payload transmission resource; a fourth number of preambles per preamble transmission resource set, wherein a preamble transmission resource set is a minimal granularity in the mapping; a fifth number of payload transmission codes per payload transmission resource set, wherein a payload transmission resource set is a minimal granularity in the mapping; and payload transmission code start index. Each of the first, second, third, fourth and fifth numbers may be an integer or a fraction.

The transport block size determiner 326 in this example may determine a transport block size (TBS) for payload transmission between the UE and the BS 300. In one embodiment, the transport block size determiner 326 determines the TBS based on a preamble group to which the preamble belongs. In another embodiment, the transport block size determiner 326 determines the TBS based a payload transmission resource on which the payload is received.

The specific payload generator and analyzer 328 in this example may perform UE-specific payload communication with the UE. In one embodiment, the specific payload generator and analyzer 328 transmits, via the transmitter 312 to the UE, a payload specific to the UE on a transmission resource configured in the second message. In another embodiment, the specific payload generator and analyzer 328 receives, via the receiver 314 from the UE, a payload specific to the UE on a reception resource configured in the second message.

The failure and fallback indication generator 329 in this example may generate indication related to failure and fallback operations in the RACH procedure. In one embodiment, the failure and fallback indication generator 329 may generate a negative acknowledgement (NACK) indicator for a retransmission of the first message in response to a decoding error of the preamble, and inform the random access message generator 322 to generate the second message based on the NACK indicator. In another embodiment, the failure and fallback indication generator 329 may generate a fallback random access response (RAR) to a 4-step RACH in response to a decoding error of the payload, and inform the random access message generator 322 to generate the second message based on the fallback RAR. In yet another embodiment, the failure and fallback indication generator 329 may generate an indicator for a retransmission of the payload in response to a decoding error of the payload, and inform the random access message generator 322 to generate the second message based on the indicator.

As used herein, the term "layer" refers to an abstraction layer of a layered model, e.g. the open systems interconnection (OSI) model, which partitions a communication system into abstraction layers. A layer serves the next higher layer above it, and is served by the next lower layer below it.

The power module 308 can include a power source such as one or more batteries, and a power regulator, to provide regulated power to each of the above-described modules in FIG. 3. In some embodiments, if the BS 300 is coupled to a dedicated external power source (e.g., a wall electrical outlet), the power module 308 can include a transformer and a power regulator.

The various modules discussed above are coupled together by a bus system 330. The bus system 330 can include a data bus and, for example, a power bus, a control signal bus, and/or a status signal bus in addition to the data bus. It is understood that the modules of the BS 300 can be operatively coupled to one another using any suitable techniques and mediums.

Although a number of separate modules or components are illustrated in FIG. 3, persons of ordinary skill in the art will understand that one or more of the modules can be combined or commonly implemented. For example, the processor 304 can implement not only the functionality described above with respect to the processor 304, but also implement the functionality described above with respect to the random access message analyzer 320. Conversely, each of the modules illustrated in FIG. 3 can be implemented using a plurality of separate components or elements.

Figure 4:
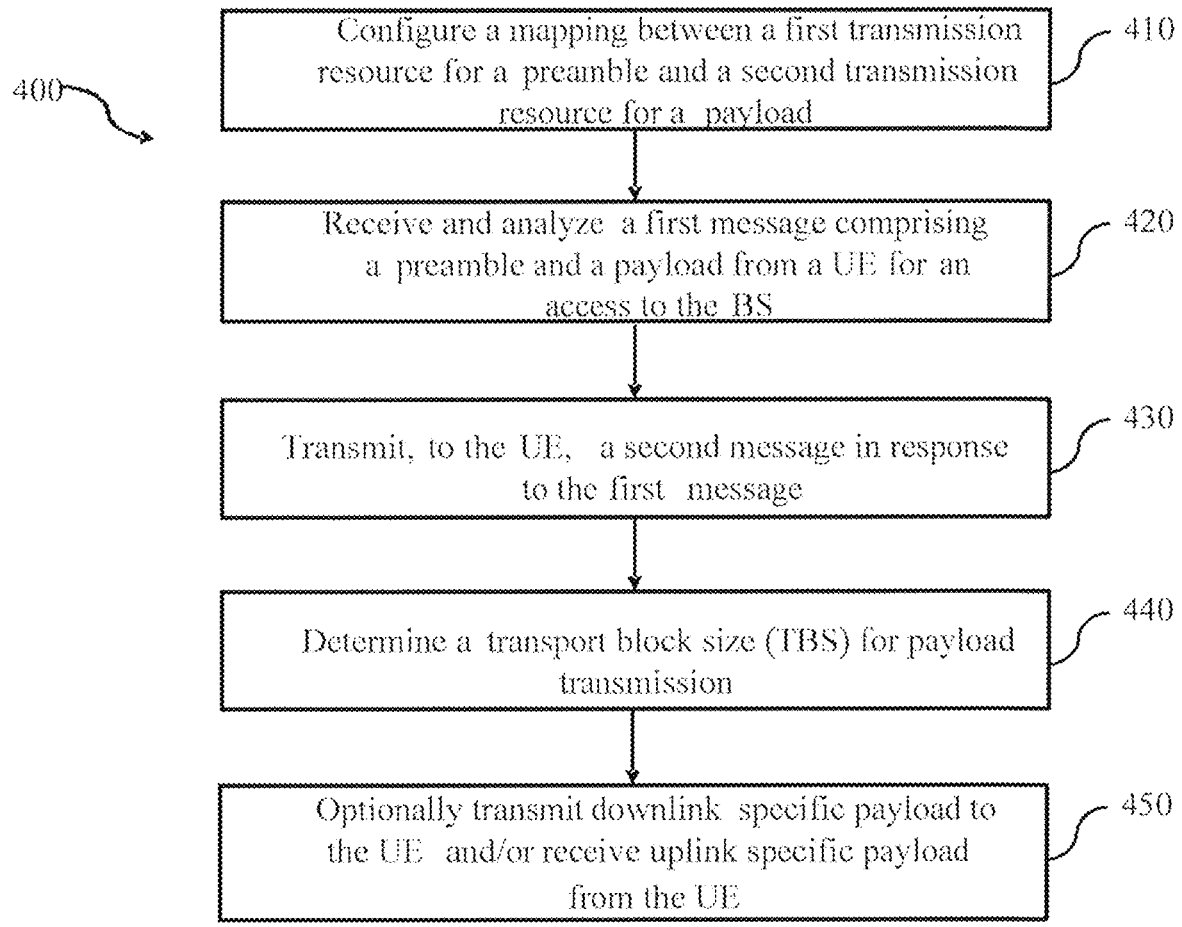
FIG. 4 illustrates a flow chart for a method performed by a BS for performing a random access procedure, in accordance with some embodiments of the present disclosure.

FIG. 4 illustrates a flow chart for a method 400 performed by a BS, e.g. the BS 300 in FIG. 3, for performing a random access procedure, in accordance with some embodiments of the present disclosure. At operation 410, the BS configures a mapping between a first transmission resource for a preamble and a second transmission resource for a payload. At operation 420, the BS receives and analyzes a first message comprising a preamble and a payload from a UE for an access to the BS. At operation 430, the BS transmits, to the UE, a second message in response to the first message. At operation 440, the BS determines a transport block size (TBS) for payload transmission. At operation 450, the BS optionally transmits downlink specific payload to the UE and/or receives uplink specific payload from the UE.

Figure 5:
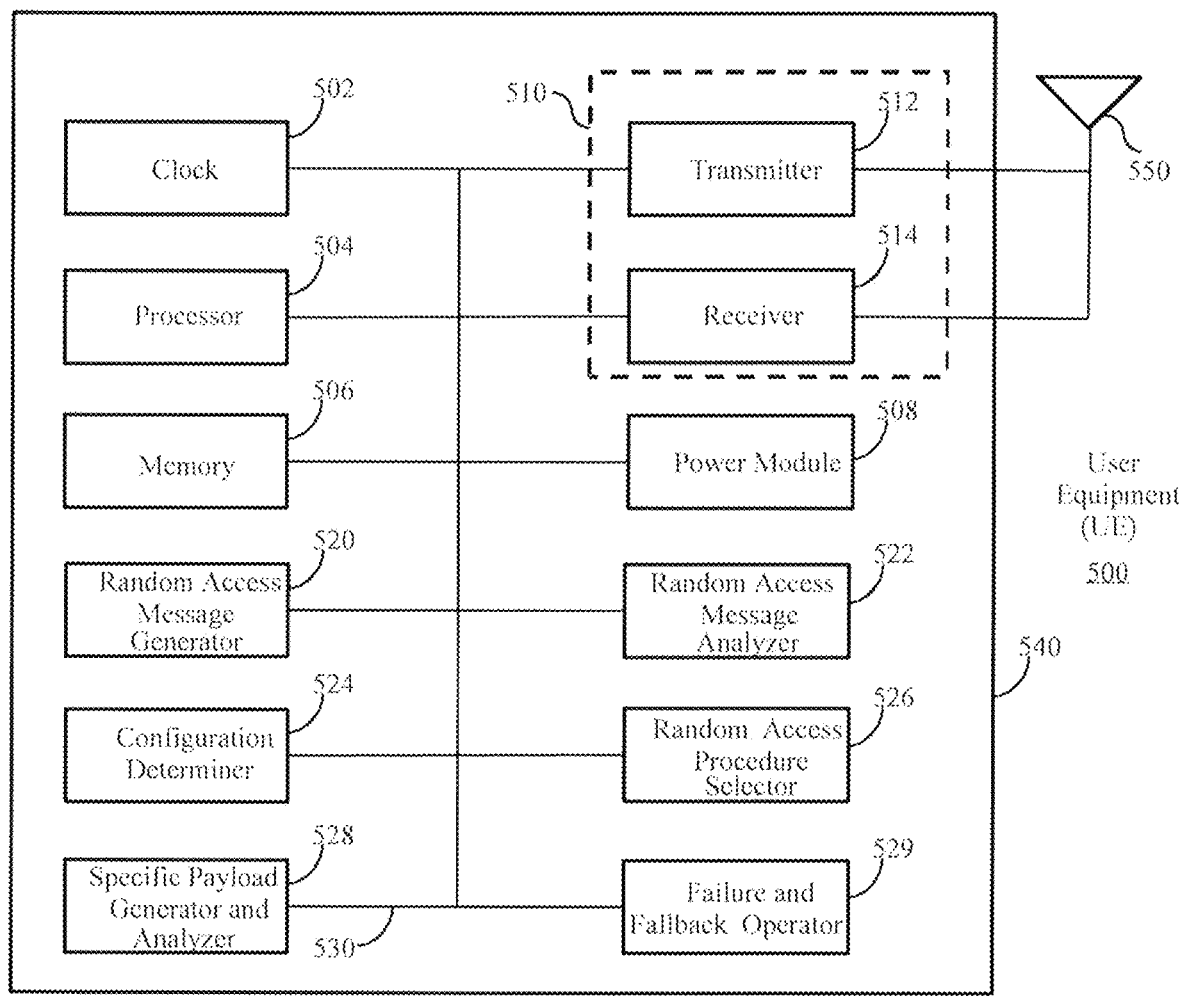
FIG. 5 illustrates a block diagram of a user equipment (UE), in accordance with some embodiments of the present disclosure.

FIG. 5 illustrates a block diagram of a user equipment (UE) 500, in accordance with some embodiments of the present disclosure. The UE 500 is an example of a device that can be configured to implement the various methods described herein. As shown in FIG. 5, the UE 500 includes a housing 540 containing a system clock 502, a processor 504, a memory 506, a transceiver 510 comprising a transmitter 512 and a receiver 514, a power module 508, a random access message generator 520, a random access message analyzer 522, a configuration determiner 524, a random access procedure selector 526, a specific payload generator and analyzer 528, and a failure and fallback operator 529.

In this embodiment, the system clock 502, the processor 504, the memory 506, the transceiver 510 and the power module 508 work similarly to the system clock 302, the processor 304, the memory 306, the transceiver 310 and the power module 308 in the BS 300. An antenna 550 or a multi-antenna array 550 is typically attached to the housing 440 and electrically coupled to the transceiver 510.

In a communication system, the UE 500 may want to access a BS for data transfer. In one embodiment, the random access message generator 520 may generate a first message comprising a preamble and a payload for an access to the BS. The random access message generator 520 may transmit the first message via the transmitter 512 to the BS. In one embodiment, the preamble and the payload are transmitted in either a same slot or different slots based on at least one of: a pre-determined protocol and a configuration through a high-layer signaling. The random access message generator 520 may inform the random access message analyzer 522 about the first message so that the random access message analyzer 522 will monitor a response from the BS.

The random access message analyzer 522 in this example may receive, via the receiver 514 from the BS, a second message in response to the first message. The random access message analyzer 522 may analyze the second message to determine that the second message comprises a plurality of responses for a plurality of UEs. In this case, the random access message analyzer 522 may analyze the second message to identify a response to the first message from the second message based on information related to at least one of the following included in the first message: a contention resolution identifier (ID); a cell radio network temporary identifier (C-RNTI); an inactive-state radio network temporary identifier (I-RNTI); and a random access preamble (RAP) ID.

In one embodiment, the second message comprises information related to at least one of: a contention resolution identifier (ID); an uplink (UL) grant that comprises subsequent resources for subsequent UL transmissions; a downlink (DL) grant that comprises subsequent resources for subsequent DL transmissions; a cell radio network temporary identifier (C-RNTI); a time advance (TA) command; a backoff indicator; a fallback random access response (RAR); a retransmission indication; a negative acknowledgement (NACK) indication; and an active bandwidth part (BWP)

indication. The second message may be scheduled by at least one of: a random access radio network temporary identifier (RA-RNTI); a temporary cell radio network temporary identifier (TC-RNTI); and a cell radio network temporary identifier (C-RNTI). As such, the random access message analyzer 522 may monitor the RA-RNTI, C-RNTI, TC-RNTI, or both RA-RNTI and C-RNTI, according to various embodiments.

In another embodiment, the random access message analyzer 522 may analyze to the second message to distinguish between a 2-step RACH and a 4-step RACH for the second message based on at least one of: a separate control resource set (CORESET) configured for receiving the second message in the 2-step RACH compared to the 4-step RACH; a separate search space configured for receiving the second message in the 2-step RACH compared to the 4-step RACH; a RA type indicator carried in a physical layer signaling, e.g. a RA type indicator in downlink control information (DCI) carried in PDCCH, through which the Msg2 is scheduled; and a different offset added in a calculation of random access radio network temporary identifier (RA-RNTI) for monitoring the second message in the 2-step RACH compared to the 4-step RACH. An offset added in the calculation of RA-RNTI may be based on at least one of: a fixed value according to a pre-determined protocol; a configurable value configured by a high-layer signaling; and a value calculated based on a fixed value and a configurable value.

The configuration determiner 524 in this example may determine a configuration of a mapping between a first transmission resource for the preamble and a second transmission resource for the payload. The preamble and the payload are transmitted based on the first transmission resource and the second transmission resource, respectively.

In one embodiment, the configuration comprises information related to at least one of the following parameters: a first number of random access channel (RACH) occasions per payload transmission occasion; a second number of preambles per payload transmission code; a third number of preamble transmission resources per payload transmission resource; a fourth number of preambles per preamble transmission resource set, wherein a preamble transmission resource set is a minimal granularity in the mapping; a fifth number of payload transmission codes per payload transmission resource set, wherein a payload transmission resource set is a minimal granularity in the mapping; and payload transmission code start index. Each of the first, second, third, fourth and fifth numbers may be an integer or a fraction.

The configuration determiner 524 may also determine a transport block size (TBS) for payload transmission between the UE 500 and the BS. In one embodiment, based on the TBS, the configuration determiner 524 may determine a preamble group, and inform the random access message generator 520 to select the preamble from the preamble group. In another embodiment, based on the TBS, the configuration determiner 524 may determine a payload transmission resource, and inform the random access message generator 520 to transmit the payload on the payload transmission resource.

The random access procedure selector 526 in this example may select a random access (RA) procedure between a 2-step RACH and a 4-step RACH based on information related to at least one of: whether the UE 500 supports a 2-step RACH; a comparison between a reference signal received power (RSRP) measurement result and a threshold; a comparison between a path loss and a threshold; an operation of a backoff timer; a logical channel that triggers the RA; an event that triggers the RA; a comparison between a buffer size and a threshold; and a subscription of the UE 500.

The specific payload generator and analyzer 528 in this example may perform UE-specific payload communication with the BS. In one embodiment, the specific payload generator and analyzer 528 transmits, via the transmitter 512 to the BS, a payload specific to the UE on a transmission resource configured in the second message. In another embodiment, the specific payload generator and analyzer 528 receives, via the receiver 514 from the BS, a payload specific to the UE on a reception resource configured in the second message.

The failure and fallback operator 529 in this example may perform failure and fallback operations in the RACH procedure. In one embodiment, the failure and fallback operator 529 may inform the random access message generator 520 to retransmit, via the transmitter 512, the first message in response to a negative acknowledgement (NACK) indicator in the second message due to a decoding error of the preamble at the BS. In another embodiment, the failure and fallback operator 529 may generate and transmit, via the transmitter 512, a third message in response to a fallback random access response (RAR) to a 4-step RACH in the second message due to a decoding error of the payload at the BS. In yet another embodiment, the failure and fallback operator 529 may inform the random access message generator 520 to retransmit, via the transmitter 512, the payload in response to an indicator in the second message due to a decoding error of the payload at the BS. In still another embodiment, the failure and fallback operator 529 may enable the UE 500 to perform an autonomous fallback to a 4-step RACH based on no detection of a response to the first message in a pre-determined time window.

The various modules discussed above are coupled together by a bus system 530. The bus system 530 can include a data bus and, for example, a power bus, a control signal bus, and/or a status signal bus in addition to the data bus. It is understood that the modules of the UE 500 can be operatively coupled to one another using any suitable techniques and mediums.

Although a number of separate modules or components are illustrated in FIG. 5, persons of ordinary skill in the art will understand that one or more of the modules can be combined or commonly implemented. For example, the processor 504 can implement not only the functionality described above with respect to the processor 504, but also implement the functionality described above with respect to the random access message generator 520. Conversely, each of the modules illustrated in FIG. 5 can be implemented using a plurality of separate components or elements.

Figure 6:
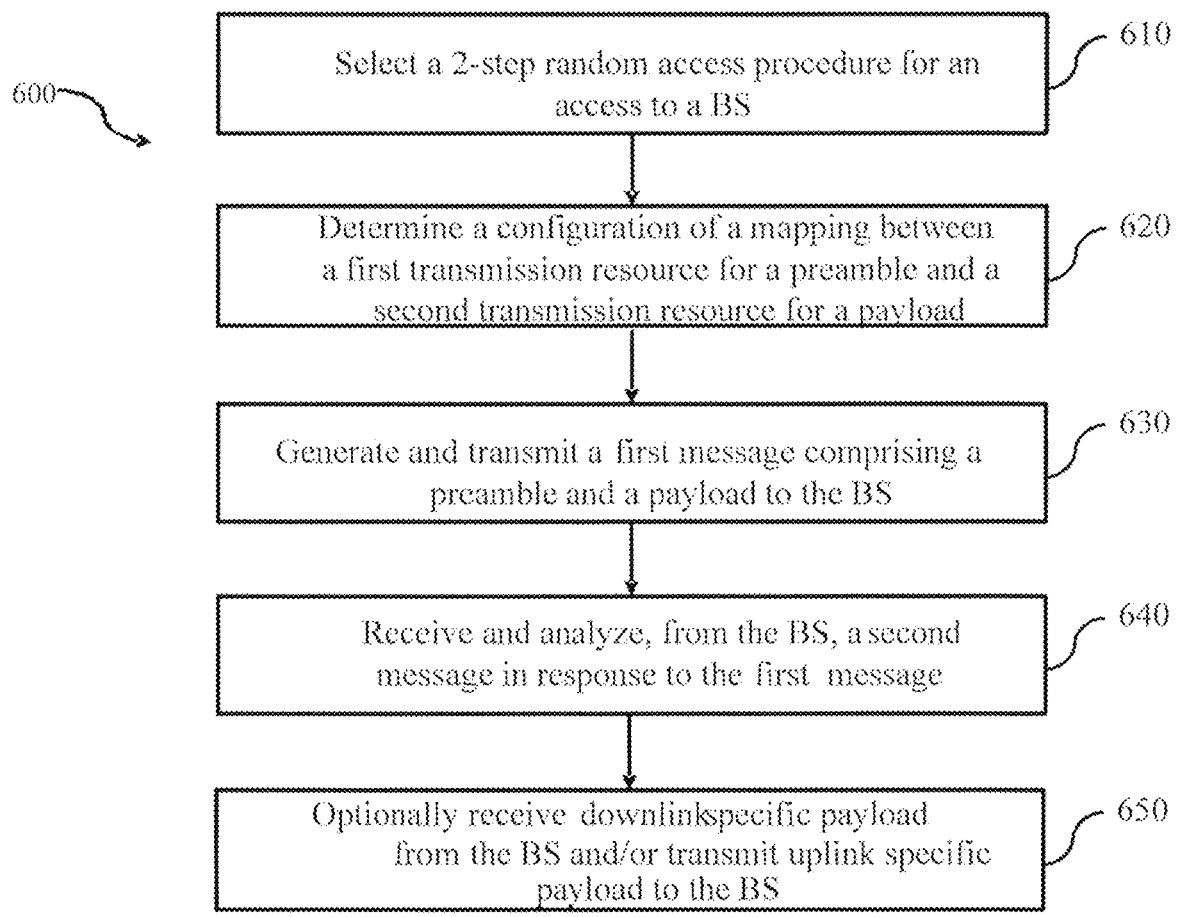
FIG. 6 illustrates a flow chart for a method performed by a UE for performing a random access procedure, in accordance with some embodiments of the present disclosure.

FIG. 6 illustrates a flow chart for a method 600 performed by a UE, e.g. the UE 500 in FIG. 5, for performing a random access procedure, in accordance with some embodiments of the present disclosure. At operation 610, the UE selects a 2-step random access procedure for an access to a BS. At operation 620, the UE determines a configuration of a mapping between a first transmission resource for a preamble and a second transmission resource for a payload. At operation 630, the UE generates and transmits a first message comprising a preamble and a payload to the BS. At operation 640, the UE receives and analyzes, from the BS, a second message in response to the first message. At operation 650, the UE optionally receives downlink specific payload from the BS and/or transmits uplink specific payload to the BS.

Different embodiments of the present disclosure will now be described in detail hereinafter. It is noted that the features of the embodiments and examples in the present disclosure may be combined with each other in any manner without conflict.

In one embodiment, the preamble and payload can be transmitted in either the same slot or different slots, which can be specified in protocols or configured through radio resource control (RRC) signaling (e.g. system information or RRC dedicated signaling). In the present teaching, the transmission in step 1 of the 2-step RACH is called Message 1 (Msg1), which includes the preamble and data. The Msg1 can either be transmitted in one shot in physical layer or be transmitted in two shot (e.g. in case the transmission resources for preamble and payload located in two different time slot).

For the transmission of payload part, the demodulation reference signal (DMRS) can be embedded in payload transmission. The existence of DMRS can either be specified in protocols (fixed) or be configured by BS through RRC signaling (e.g. system information or RRC dedicated signaling). The payload transmission can be carried in physical uplink shared channel (PUSCH) or some newly defined physical channels.

In one embodiment, the Msg1 transmission may include two steps: the preamble transmission and payload transmission. Considering the preamble will be used as some kind of assistant information in the decoding of payload part, the association between preamble and payload transmission resources (including payload transmission occasion and payload transmission code index, where the occasion refers to the time/frequency resources) should be known by BS side.

Based on the preamble resource selection procedure in 4-step RACH, in case there are multiple consecutive ROs (RACH occasion, which refers to the time/frequency resource of preamble transmission) for the selected synchronization signal block (SSB), the UE may select the RO randomly among the consecutive ROs. Once the RO is selected, the UE may select the preambles randomly within the preambles reserved for the selected SSB within the selected RO. Since it is random selection in the preamble selection, it will be difficult to process two resources selection procedures separately for preamble resource and payload resources. Therefore, for the transmission resource selection for preamble and payload in step 1, the following alternatives can be considered. In a first alternative, the preamble resources and payload resource will be treated as a pair, and the UE may select both resource at the same time (e.g. UE selects the pair of resource for preamble and payload). In a second alternative, UE selects the preamble first and then selects the payload transmission resources according to the preamble resource selected. No matter which alternative is used, some mapping may be made between the preamble transmission resource and the payload transmission resources.

The preamble transmission resource may include: the location of preamble transmission resource in time domain; the location of preamble transmission resource in frequency domain; the location of preamble transmission resource in code domain (i.e. preamble index). The physical random access channel (PRACH) transmission occasion/RACH transmission occasion (RO) refers to the location of preamble transmission resource in time and frequency domain.

The payload transmission resource may include: the location of payload transmission resource in time domain; the location of payload transmission resource in frequency domain; the location of payload transmission resource in code domain (e.g. Orthogonal code, non-Orthogonal code, or some other code which will be used in physical layer, to simplify the description, the code is named as "payload transmission code"); the bandwidth/physical resource block (PRB) used for payload transmission. The payload transmission occasion refers to the location of payload transmission resource in time and frequency domain. The "payload transmission code" can be used in non-orthogonal multiple access (NOMA) or multi-user shared access (MUSA) operation to provide better performance in case the time/frequency resource is shared by multiple UEs.

For the mapping between preamble transmission resource and payload transmission resource, the following flexibility can be allowed in the mapping configuration: preamble transmission resources located in different ROs can be mapped to the same payload transmission occasion with different payload transmission code; different preambles within one RO can be mapped to different payload transmission occasions (with the same or different payload transmission code); multiple UE using different preambles can mapped the same payload transmission resources (i.e. the same payload transmission code within the same payload transmission occasion); one preamble resources (combination of preamble+RO) can be mapped to multiple payload transmission code within one payload transmission occasion to enable the multi-layer data transmission, e.g. multiple-input and multiple-output (MIMO); the timing offset between preamble transmission resources and payload transmission resources can be different for different preamble transmission resources (e.g. the same or next time slot).

The following mapping solution can be considered. In a first alternative, identify each preamble resources/payload transmission resources within one association period with one unique ID. The second alternative is based on a 2-step mapping which maps RO to payload transmission occasion and maps preamble to payload transmission code. The third alternative is based on a 2-step mapping which maps RACH occasion in time domain to payload transmission occasion in time domain, and then leaves the frequency domain and Code domain mapping to mapping rule. The fourth alternative is to explicitly map between RO and payload transmission occasion, and the mapping between preamble and payload transmission code is derived based on pre-defined rule.

To configure the mapping between preamble transmission resource and payload transmission resource, the following parameters can be configured to UE through RRC signaling (e.g. in system information or RRC dedicated signaling), where different parameters may be used for different alternative solutions.

Figure 7:
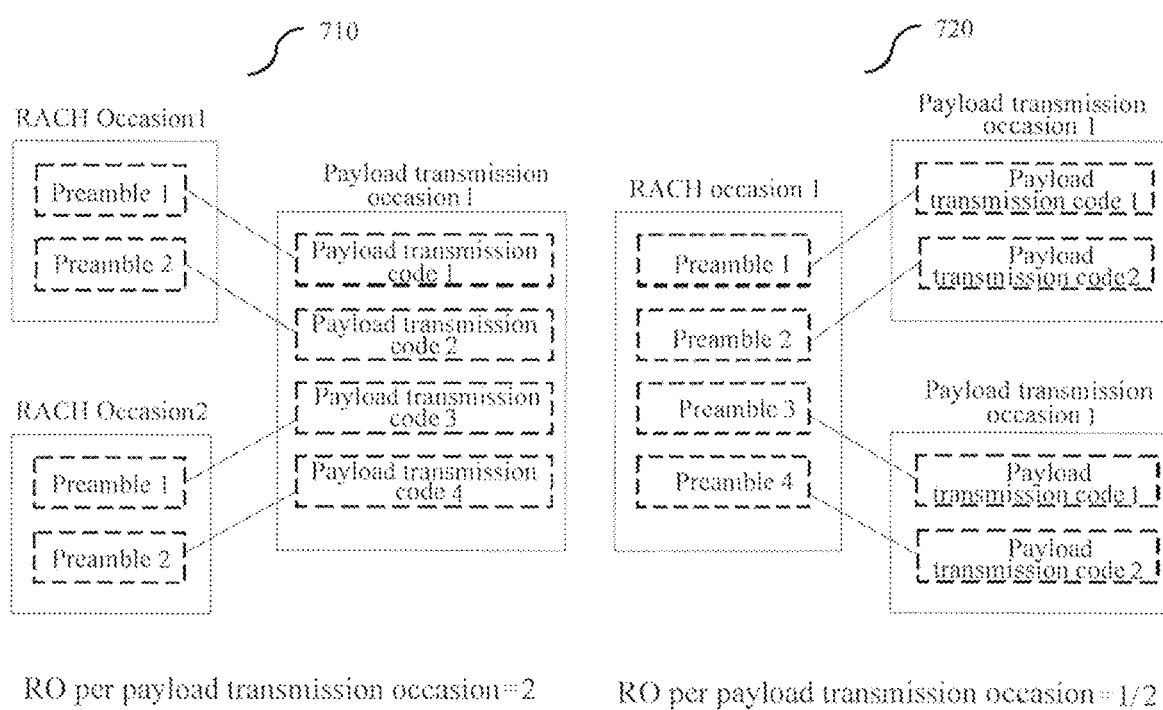
FIG. 7 illustrates an exemplary usage of random access channel (RACH) occasion per payload transmission occasion, in accordance with some embodiments of the present disclosure.

One parameter may be RO per payload transmission occasion (or payload transmission occasion per RO), which represents how many RO (RACH occasion) can be mapped to one payload transmission occasion. FIG. 7 illustrates an exemplary usage of this parameter, in accordance with some embodiments of the present disclosure. This parameter may be an integer, e.g. RO per payload transmission occasion=2, as shown in 710 of FIG. 7; and may be a fraction, e.g. RO per payload transmission occasion=½, as shown in 720 of FIG. 7.

Figure 8:
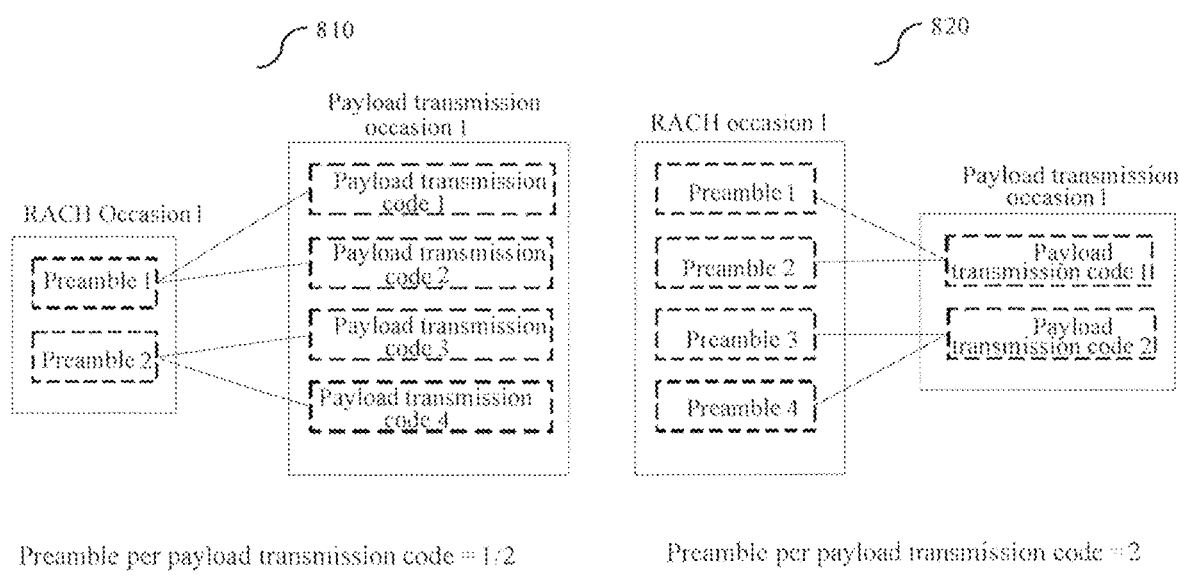
FIG. 8 illustrates another exemplary usage of preamble per payload transmission code, in accordance with some embodiments of the present disclosure.

One parameter may be preamble per payload transmission code (or payload transmission code per preamble), which represents how many preambles can be mapped to one payload transmission code. FIG. 8 illustrates an exemplary usage of this parameter, in accordance with some embodiments of the present disclosure. This parameter may be an integer, e.g. preamble per payload transmission code=2, as shown in 820 of FIG. 8; and may be a fraction, e.g. preamble per payload transmission code=½, as shown in 810 of FIG. 8.

One parameter may be preamble resource per payload resources, whose value n means n preamble transmission resources can be mapped to one payload transmission resource. One parameter may be preambles per preamble transmission resources set, where the preamble transmission resources set is minimal granularity in the mapping between preamble transmission resource and payload transmission resource. One parameter may be payload transmission code per payload transmission resource set, where the payload transmission resource set is minimal granularity in the mapping between preamble transmission resource and payload transmission resource.

Figure 9:
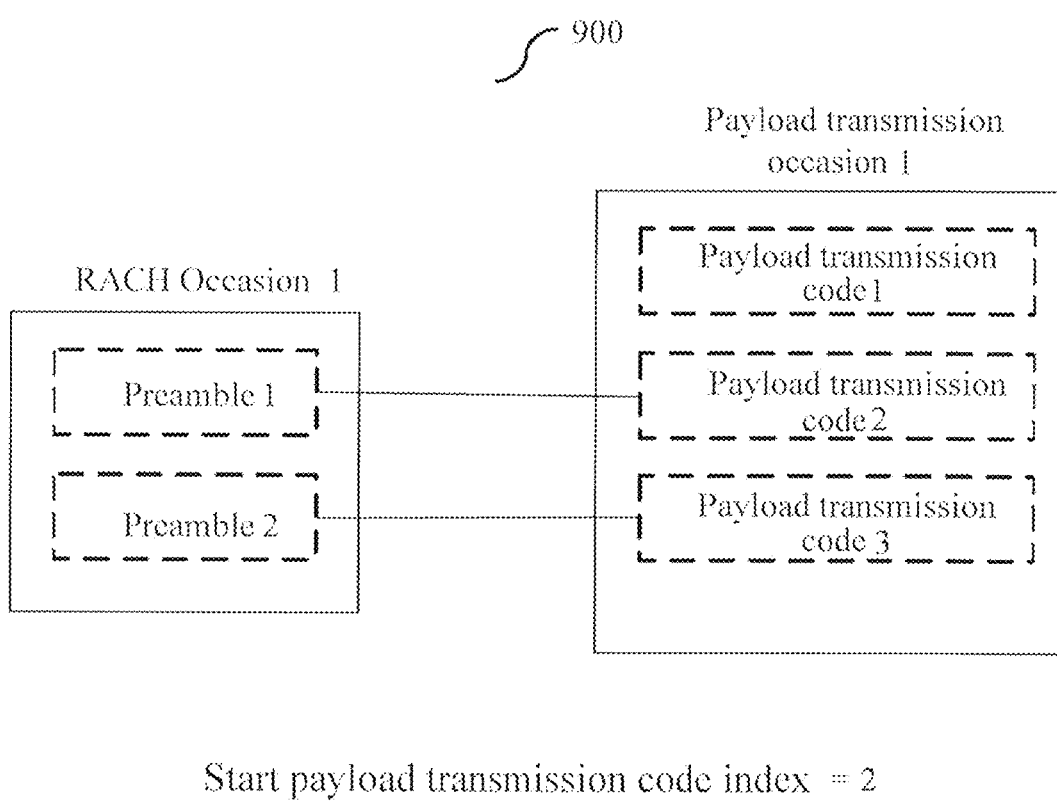
FIG. 9 illustrates an exemplary usage of payload transmission code start index, in accordance with some embodiments of the present disclosure.
Figure 10:
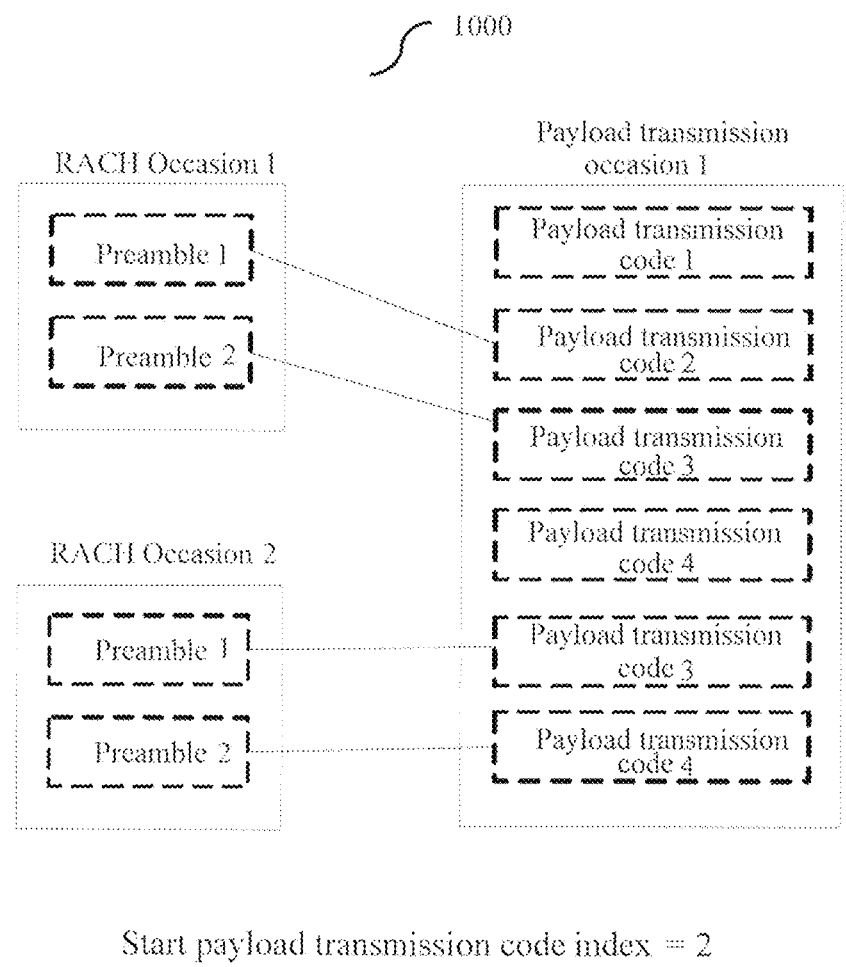
FIG. 10 illustrates another exemplary usage of payload transmission code start index, in accordance with some embodiments of the present disclosure.

One parameter may be start payload transmission code index or payload transmission code start index, which is configured for one specific RO. The nth 2-step RACH available preamble within that RO is mapped to the "start payload transmission code index+n" payload transmission code. FIG. 9 and FIG. 10 illustrate two exemplary usages 900, 1000 of payload transmission code start index, in accordance with some embodiments of the present disclosure.

The alternative to identify each preamble resources/payload transmission resources within one association period with one unique ID is discussed in detail below. For each preamble transmission resources within one association period, the preamble transmission resource ID can be derived based on the following rules, where synchronization signal physical broadcast channel (SS/PBCH) block indexes are mapped to PRACH occasions in the following order where the parameters are described in an existing protocol. First, in increasing order of preamble indexes within a single PRACH occasion. Second, in increasing order of frequency resource indexes for frequency multiplexed PRACH occasions. Third, in increasing order of time resource indexes for time multiplexed PRACH occasions within a PRACH slot. Fourth, in increasing order of indexes for PRACH slots.

For each payload transmission resources within one association period, the payload transmission resource ID can be derived based on the following rules. First, in increasing order of payload transmission code indexes within a single payload transmission occasion. Second, in increasing order of frequency resource indexes for frequency multiplexed payload transmission occasions. Third, in increasing order of indexes for payload slots.

With the preamble resource ID and payload transmission resource ID, one can have a one-to-one mapping between the preamble resource ID and payload transmission resource ID, where the preamble resource and payload transmission resource with the same ID can be considered as a pair.

In order to support the case that "two preambles within one RO are mapped to the same payload transmission resources" and the case that "one preamble resource is mapped to two payload transmission code within one payload transmission occasion," the following methods can be considered.

In a first method, a one-to-many mapping is enabled based on the index. One index still refers to one preamble/payload transmission resource. But one preamble can be mapped to multiple payload transmission resource indexes. Some kind of group factor (e.g. how many preamble (payload) transmission resource indexes may be mapped to one payload (preamble) index) may be introduced. For example, for the parameter "preamble resource per payload resources," its value n means n preamble transmission resources can be mapped to one payload transmission resource. For example, preamble resource per payload resources=2 means 2 preamble transmission resource indexes are mapped to one payload transmission resource index; preamble resource per payload resources=½ means 1 preamble transmission resource index is mapped to two payload transmission resource indexes.

In a second method, the resources with a same index ID are grouped together. The index refers to the minimal granularity in the mapping operation. Some kind of group factor can be introduced. With the grouping factor, the preamble resource configuration index and the payload transmission resource configuration index are given. Each "Preamble resource configuration index" refers to one or more preambles within one specific RACH occasion. The parameter "preambles per preamble transmission resources set" can be used to indicate how many preambles are linked to one preamble transmission index. Each "payload transmission resource configuration index" refers to one or more payload transmission code within one specific payload transmission occasion. The parameter "payload transmission code per payload transmission resource set" can be used to indicate how many payload transmission codes are linked to one payload transmission index within one specific payload transmission occasion. Each "Preamble resource configuration set index" will be mapped to the payload transmission resource configuration set index with the same value.

The alternative to map RO to payload transmission occasion and to map preamble to payload transmission code is discussed in detail below. A payload transmission occasion pool (i.e. time/frequency resource of payload) and a payload transmission code pool (e.g. maximum number of payload transmission code per payload transmission occasion) are configured. A parameter "RO per payload transmission occasion" is configured to indicate that how many ROs are mapped to one payload transmission occasion (the value can be less than 1, e.g. ¼). The UE determines the payload transmission occasion based on the RO, and then selects the payload transmission code based on the preamble selected.

In this alternative, a list of payload transmission occasions (time/frequency resources) can be configured, and the RO is mapped to the list of payload transmission occasion based on the index of payload transmission occasion in the list in ascending order. The "index of payload transmission occasion in the list" can be either an explicit configured index in the signaling for each payload transmission occasion, or an implicit index which is deduced by the order of "payload transmission occasion" in the configuration list. For the code domain, the parameter "preamble per payload transmission code" can be used to determine how many preambles can be mapped to one payload transmission code.

The alternative to map RACH occasion in time domain to payload transmission occasion in time domain first, and then to map frequency domain and code domain mapping is discussed in detail below. The time instance of RACH occasion may be mainly determined by the PRACH configuration index, which is defined in Table 1 below.

TABLE 1

Random access configurations for frequency range 1 (FR1) and paired spectrum/supplementary uplink:

| PRACH Configuration Index | Preamble format | $n_{SFN}$ mod $x = y$ | | Sub-frame number | Starting symbol | Number of PRACH slots within a sub-frame | $N_t^{RA, slot}$, number of time-domain PRACH occasions within a RACH slot | $N_{dur}^{RA}$, PRACH duration |
|---|---|---|---|---|---|---|---|---|
| | | x | y | | | | | |
| 0 | 0 | 16 | 1 | 1 | 0 | — | — | 0 |
| 1 | 0 | 16 | 1 | 4 | 0 | — | — | 0 |
| 2 | 0 | 16 | 1 | 7 | 0 | — | — | 0 |
| 3 | 0 | 16 | 1 | 9 | 0 | — | — | 0 |
| 4 | 0 | 8 | 1 | 1 | 0 | — | — | 0 |
| 5 | 0 | 8 | 1 | 4 | 0 | — | — | 0 |
| 6 | 0 | 8 | 1 | 7 | 0 | — | — | 0 |

Based on Table 1 shown above, it can be observed that the time instance of preamble may be determined according to the table. Therefore, for the time location of payload transmission resources, one possibility is to introduce the location of payload transmission resource in time domain in the table as well. For example, the following columns (or some of the following columns) can be added in the table: subframe number for payload; starting symbol for payload; number of payload transmission slots within a sub-frame; payload transmission duration; and number of time-domain payload occasions within a slot.

If some configuration has to be the same as the preamble resources, then the column can be omitted in the table. In one embodiment, some rules (e.g. offset) may be defined in the protocols to calculate the payload resources. In that case the column can be omitted as well.

If the time instance of payload can be determined by the table, then one only need to determine the mapping in frequency domain and code domain accordingly. The RO per payload transmission occasion means how many ROs in the same time instance can be mapped to one payload transmission occasion, whose value can be a fraction (e.g. ½ means one preamble occasion is mapped to two payload transmission occasion). The preamble per payload transmission code means how many preamble codes can be mapped to one payload transmission code, whose value can be a fraction (e.g. ½ means one preamble is mapped to two payload transmission codes).

The alternative to explicitly map between RO and payload transmission occasion, and to map between preamble and payload transmission code based on a pre-defined rule is discussed in detail below. For each RO, one or more payload transmission occasions are configured explicitly. A "start payload transmission code index" or "payload transmission code start index" can be configured for each RO to indicate the start point of payload transmission code. With the "start payload transmission code index", the nth preamble is mapped to the "start payload transmission code index+n" payload transmission code. In one embodiment, for each preamble index, one or more payload transmission codes can be configured explicitly.

In one alternative, the UE, when accessing the network using unlicensed spectrum, may prepare the payload and the preamble format corresponding to a plurality of ROs according to the above embodiments. Subsequent to this, the UE may perform a listen before talk (LBT) operation to determine which RO is available for transmission in the unlicensed spectrum and select the payload and preamble format corresponding to the determined RO for transmission and transmit it to the BS. This enables the UE to quickly transmit over the unlicensed spectrum without losing the transmission window determined by performing the LBT operation.

In one embodiment, the payload transmitted in step 1 may be a medium access control (MAC) protocol data unit (PDU), and the MAC PDU may include one or more elements of the following: a common control channel (CCCH) message; a dedicated control channel (DCCH) message; a MAC service data unit (SDU) from data radio bearer (DRB); and a MAC control element (CE). The MAC CE may be e.g. C-RNTI, UE ID, BSR (buffer status report).

The MAC CE refers to the MAC control element. The MAC CEs transmitted in the payload of Msg1 may include one or more of the following information: C-RNTI; I-RNTI; UE-ID; BSR (buffer status report); PHR (power headroom report); beam measurement result; and beam failure indication. In one embodiment, the above listed information may be carried as separate MAC CEs. In another embodiment, some of the above listed information can be grouped as a single MAC CE.

In case both the 2-step RA configuration and the 4-step RA configuration are broadcasted in system information block type 1 (SIB1), the RA type selection is needed, e.g. between a 2-step RACH and a 4-step RACH, at least in an initial access case. The following alternatives can be considered in RA type selection between 2-step RACH and 4-step RACH. These alternatives can be used separately or as a combination of some of the alternatives. In a first alternative, a UE supporting 2-step RACH will always select 2-step RACH. In a second alternative, the RA type selection is based on whether RSRP measurement result is above (or "above or equal") or below (or "below or equal") a threshold. The threshold is configured through RRC signaling (e.g. system information or dedicated RRC signaling). In a third alternative, the RA type selection is based on whether the path loss is above (or "above or equal") or below (or "below or equal") a threshold. The threshold is configured through RRC signaling (e.g. system information or dedicated RRC signaling). In a fourth alternative, the RA type selection is based on the running of backoff timers. In a fifth alternative, the RA type selection is based on the logical channel (LCH) or logical channel group (LCG) which triggers the RA or the event which triggers the RA. The LCH or LCG which can trigger 2-step RACH or the event which can trigger 2-step RACH may either be specified in protocols or configured through RRC signaling (e.g. system information or dedicated RRC signaling). In a sixth alternative, the RA type selection is based on the buffer size, e.g. whether the buffer size is above (or "above or equal") or below (or "below or equal") a threshold. The threshold is configured through RRC signaling (e.g. system information or dedicated RRC signaling). In a seventh alternative, the RA type selection is based on subscription.

The above alternatives can be used as a combination. For example, a combination of the fifth and the sixth alternatives will make a new event when the buffer size for a specific LCH is below a threshold. A combination of the second and the third alternatives will lead to that the UE has to fulfill simultaneously the two conditions of: the RSRP is larger than the RSRP threshold and the PATH LOSS is smaller than the pass loss threshold.

The detailed rules and explanation for each of the above alternatives are given as below. For the first alternative, the UE supporting 2-step RACH will always select 2-step RACH as the initial RA transmission, while a fallback to 4-step RA can be triggered later. For the second alternative, the UE may select 2-step RACH in case the measured RSRP is higher (or "higher or equal") than one pre-configured threshold. For the third alternative, the UE may select 2-step RACH in case the path loss is lower (or "lower or equal") than a pre-configured threshold. The path loss can also be used to estimate the time advance (TA), e.g. whether the TA will exceed the CP. For the fourth alternative, separate back off timers may be maintained for 2-step RACH and 4-step RACH. If the BI timer for 2-step RACH is running but the BI timer for 4-step RACH is not running, then the UE can select 4-step RACH.

For the fifth alternative, for the RA triggered by UL data, the RA type preferred can be configured per LCH, e.g. based on the quality of service (QoS). Once RA is triggered for the UL data transmission, then the UE may determine the RA type based on the QoS of the logical channel (LCH), which triggers the RA procedure. For example, if the RA is triggered for an ultra-reliable low-latency communication (URLLC) services, the UE can select 2-step RACH to save the latency. The CCCH can be considered as a special case of LCH, if one wants to highly prioritize one RA type for CCCH transmission. For example, if 2-step RACH has poor coverage, the UE may highly prioritize the 4-step RACH for CCCH transmission.

The sixth alternative is based on the buffer size. For the machine type communication (MTC) device in INACTIVE state, if all the data in the buffer can be transmitted through one RA procedure, then the UE can determine to process the 2-step RA without state transition. Besides the MTC small data transmission, another use case is that the UE can select 4-step RACH in case the CCCH message size is larger than a threshold.

The seventh alternative is based on subscription etc. In this alternative, an operator may configure the UEs to perform a 2-step RACH or a 4-step RACH based on the subscription information. In this case, the RA type selection can be configured to the UE, e.g. via NAS signaling which will be also applicable to UEs in IDLE mode. This may be overridden by any connected mode signaling when the UE enters INACTIVE state, etc. In addition, with this alternative, a UE that is not yet attached to the wireless network is never configured to use 2-step RACH. It can use 4-step RACH for attach procedure and may be configured via NAS signaling or connected mode signaling to use 2-step RACH subsequently. This decision may be based on the subscription information available to the operator.

For the different usages of RA procedure, the payload size required may be different. The following two alternatives can be considered to support multiple transport block sizes (TBSs). In a first alternative, the preambles are split into multiple groups. For each group, one TB size is used. In this alternative, the mapping between TB size and preamble group may be configured to UE through RRC signaling (e.g. system information or dedicated RRC signaling). For example, for each preamble group, one TB size or modulation coding scheme (MCS) is configured explicitly. In a second alternative, for each preamble, different payload transmission resources can be configured for different TB sizes. In this alternative, the mapping between TB size and payload transmission resource may be configured to UE through RRC signaling (e.g. system information or dedicated RRC signaling). For example, for each payload transmission resource, a TB size or MCS is configured.

To configure different resources for different TB sizes, the following alternatives can be considered. In a first alternative, multiple payload transmission codes for one UE are grouped. For example, one preamble is mapped to payload transmission code to enable the multi-layer transmission. In a second alternative, more resources in time/frequency domain are configured. In a third alternative, different MCSs can be used to configure different resources for different TB sizes.

In step 2 of the 2-step RACH, responses for multiple UEs can be included in one Msg2. For example, the UE using the same RO in Msg1 transmission can share a same Msg2. Each UE can identify the corresponding response among all responses within the same Msg2 based on one of the following information: contention resolution ID, which is generated based on the CCCH message included in Msg1; C-RNTI included in Msg1; I-RNTI included in Msg1; and RAP ID which is a preamble ID used in the Msg1 transmission. The RAP ID will be used to indicate the NACK or fallback indication in the abnormal case. It is also a possible solution to include only the RAP_ID in a common Msg2 and leave the contention resolution ID in the Msg2bis.

For the content of Msg2, the following information can be considered: contention resolution ID; UL grant for resources for the subsequent UL transmission; DL grant for resources for the subsequent DL transmission; C-RNTI; a TA command; a backoff indicator; a fallback RAR; a retransmission indication; a NACK indication; and an active BWP indication that indicates which BWP may be used as active BWP. The active BWP indication can be given in UL and DL separately, e.g. UL active BWP indicator and DL active BWP indicator. The active BWP indication can be included as part of the UL/DL grant or be included as an independent information. A time offset indication can be included in the UL/DL grant field to indicate the time domain location of the PUSCH/PDSCH resource. The time offset can be at radio frame level, or sub frame level or slot level or symbol level, or a combination of the granularities listed above. The information listed above can be given by either separate MAC CE or MAC subPDU or be grouped as one MAC CE or MAC subPDU.

Once the UL grant and/or DL grant is included in the corresponding response in Msg2, the UE may process the data transmission and/or reception using the granted resources. The information above may be optional in the Msg2. The presence of such information in Msg2 can be indicated by either MAC subheader/LCH or some flag bits in the MAC subPDU.

Besides the Msg2, which can be shared by multiple UEs, there can be a UE specific payload transmission following the Msg2. The UE specific payload following Msg2 can be named as: Msg3; part of Msg2; or Msg2bis. Msg3 is considered as a separate transmission which is granted in Msg2. Part of Msg2 is considered as part of Msg2. The Msg2 in 2-step RACH includes common part, in which the response to multiple UEs is included, and the UE-specific payload part.

Figure 11:
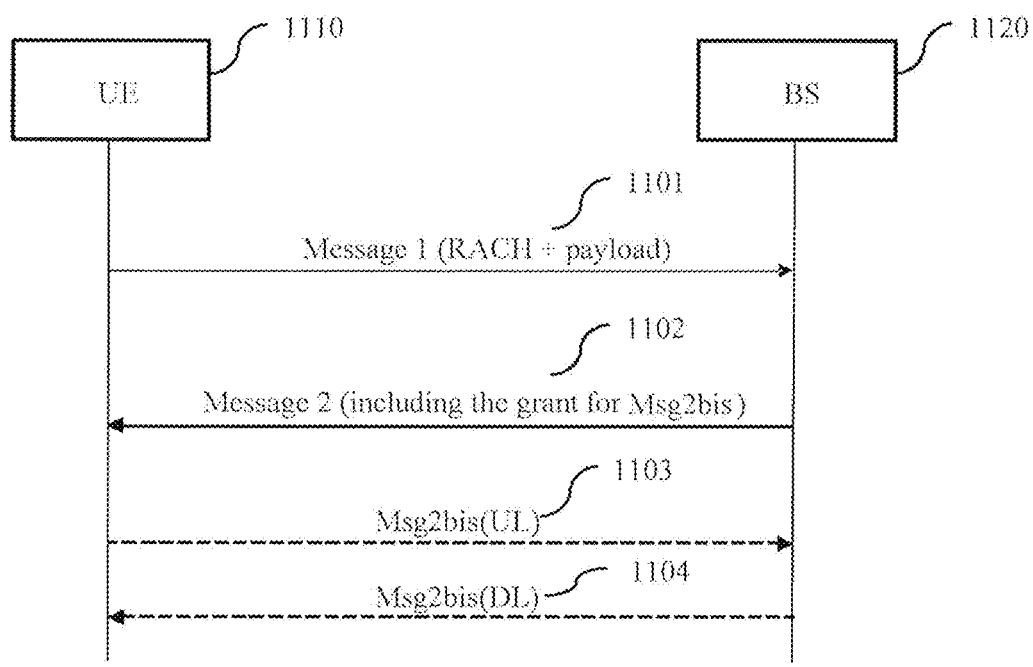
FIG. 11 illustrates an exemplary random access procedure with UE-specific payload transmission, in accordance with some embodiments of the present disclosure.
Figure 12:
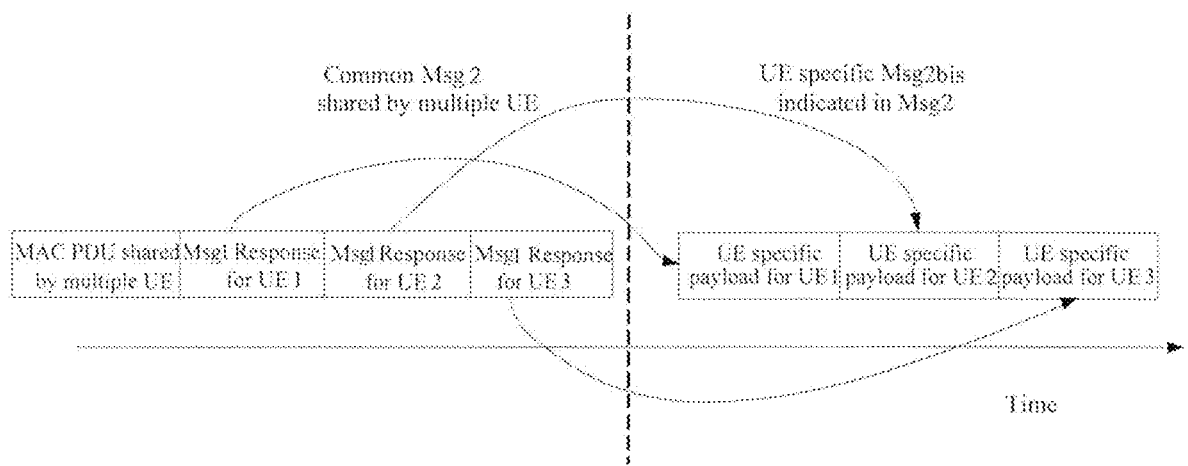
FIG. 12 illustrates an exemplary usage of DL grant in successful response of Message 2, in accordance with some embodiments of the present disclosure.

The name Msg2bis will be used in the following description for simplicity. FIG. 11 illustrates an exemplary random access procedure 1100 with UE-specific payload transmission, in accordance with some embodiments of the present disclosure. The transmission resources used for the transmission/reception of Msg2bis may be configured in Msg2 at operation 1102, e.g. UL grant and/or DL grant in Msg2. The UL grant/DL grant in Msg2 gives the Msg2bis transmission/reception resources in time/frequency domain. The Msg2bis can be UL 1103 or DL 1104 or UL+DL, e.g. when BS grants both UL and DL resources to the UE. FIG. 12 illustrates an exemplary usage 1200 of DL grant in successful response of Message 2, in accordance with some embodiments of the present disclosure. The UE specific payload can be a MAC PDU, which may include: a CCCH message; a DCCH message; a MAC SDU for DRB; a MAC CE; a contention resolution ID; and C-RNTI.

Once the message comprising the preamble and payload is transmitted in step 1, the UE may try to receive either the Msg2 scheduled by RA-RNTI or grant scheduled by C-RNTI, or both RA-RNTI and C-RNTI, within the Msg1-Response Window. If no corresponding response is received, the UE may consider the Msg1 transmission attempt to be a failure and initiate another Msg1 transmission attempt, if allowed, e.g. if the total number for retransmission attempt does not exceed a pre-configured threshold.

In case the UE monitors both the RA-RNTI and C-RNTI, the UE may receive and store the back off indicator carried in the message scheduled by RA-RNTI, and do the back off operation in case no transmission scheduled by C-RNTI has been received successfully within the Msg1-response window.

For the Msg1-Response Window, the length of Msg1-Response Window is configured in RRC signaling (e.g. system information or a dedicated RRC signaling). Any of the following start points may be considered as an alternative for the Msg1-Response Window: start once the preamble is transmitted; start after a fixed time offset after the preamble is transmitted; start at the start boundary of next or a fixed offset after slot or symbol or sub-frame or radio frame whether the preamble is transmitted; start at the end boundary of the slot or symbol or sub-frame or radio frame whether the preamble is transmitted; start once the payload is transmitted; start after a fixed time offset after the payload is transmitted; start at the start boundary of next or a fixed offset after slot or symbol or sub-frame or radio frame whether the payload is transmitted; and start at the end boundary of the slot or symbol or sub-frame or radio frame whether the payload is transmitted.

The UE may distinguish the Msg2 between 2-step RACH and 4-step RACH. Based on an existing MAC PDU format, there is no way for a legacy UE to distinguish the MAC RAR for 2-step RACH and MAC RAR for 4-step RACH. If the new RAR can be 7 bytes, then the UE can skip the new RAR for 2-step RACH, otherwise it will be difficult for the BS to avoid the false alerting to a legacy UE.

To distinguish the MAC PDU for 2-step RACH and 4-step RACH, the following alternatives can be considered. In a first alternative, separate CORESETs and/or search spaces are configured for 2-step RACH and 4-step RACH. In a second alternative, different values of RA-RNTI are configured for 2-step RACH and 4-step RACH. For example, different RA-RNTI will be used by UE to monitor the Msg2 of 2-step RACH vs. the Msg2 of 4-step RACH. In a third alternative, a RA type indicator is carried in a physical layer signaling, e.g. a RA type indicator in downlink control information (DCI) carried in PDCCH, through which the Msg2 is scheduled.

For the RA-RNTI, a calculation of RA-RNTI may be found as below. The RA-RNTI associated with the PRACH, in which the RAP is transmitted, is computed as:

$$RA-RNTI = 1 + s\_id + 14 \times t\_id + 14 \times 80 \times f\_id + 14 \times 80 \times 8 \times ul\_carrier\_id$$

where s_id is the index of the first orthogonal frequency-division multiplexing (OFDM) symbol of the specified PRACH ($0 \leq s\_id < 14$), t_id is the index of the first slot of the specified PRACH in a system frame ($0 \leq t\_id < 80$), f_id is the index of the specified PRACH in the frequency domain ($0 \leq f\_id < 8$), and ul_carrier_id is the UL carrier used for Msg1 transmission (0 for NUL carrier, and 1 for SUL carrier).

For a calculation of RA-RNTI for 2-step RACH, to distinguish the RA-RNTI for 2-step RACH and 4-step RACH, the following alternatives can be considered: separate offset; resource specific offset; and a new parameter is introduced in the formula to distinguish the RA type or RA resource pool.

In the first alternative for separate offset, since the maximum value of RA-RNTI for 4-step RACH can be calculated as "1+14+14*80+14*80+8+14×80×8×2", it is possible to have a offset which is larger or equal to the maximum value of RA-RNTI for 4-step RACH, and the RA-RNTI for 2-step RACH will be: RA-RNTI (2-step RACH)="first part of RA-RNTI, which is an offset value"+"second part of RA-RNTI, which is calculated based on the resource used in Msg1 transmission". The value of offset can be either a fixed value defined in protocols or a configurable value configured through RRC signaling (e.g. through system information or dedicated RRC signaling).

In the second alternative, an offset will be added in the resource before the RA-RNTI calculated. For example, an offset can be added in ul-carrier_id (the offset can be added in other parameters as well, such as s_id, f_id): RA-RNTI=1+s_id+14×t_id+14×80×f_id+14×80×8×(ul_carrier_id+offset).

In the third alternative, an RA type (or RA resource pool ID, etc.) is introduced, and the RA_TYPE value multiplied with a constant will be added as part of RA-RNTI. For example: RA-RNTI=1+s_id+14×t_id+14×80×f_id+14×80×8×ul_carrier_id+RA type*N. The value of N can be either fixed in protocols or configured through RRC signaling (e.g. system information or RRC dedicated signaling).

In one embodiment, the value of RA type can be: RA_type=0 for 4-step RACH; and RA_type=1 for 2-step RACH. In one embodiment, the "1+s_id+14×t_id+14×80× f_id+14×80×8×ul_carrier_id" can be revised accordingly for the 2-step RACH.

For the contention-based random access (CBRA), in case multiple UEs select the same preamble, then the collision will occur. In order to detect the collision on UE side, the contention resolution is required and will be made in the reception of Msg2. In 4-step RACH, the contention resolution can be made based on either the "UE contention resolution ID" or the transmission scheduled by C-RNTI. Similar rules can be reused in 2-step RACH as well.

For the Msg1 which includes CCCH message, the "UE contention resolution ID" MAC CE may be included in Msg2 for the purpose of contention resolution. The "UE contention resolution ID" is the first n bits copied from the CCCH message carried in Msg1. The value of n can be either a fixed value specified in protocol or configured by BS through RRC signaling (e.g. system information or RRC dedicated signaling) or indicated in the MAC CE.

For the Msg1 which includes "C-RNTI" MAC CE, it may be first clarified that whether the Msg2 is needed. In a first alternative, instead of Msg2 scheduled by RA-RNTI, one can also rely on the monitoring of C-RNTI in UE-specific configured search space within Msg1-Response Window. If no corresponding response has been received in the Msg1-Response Window, the UE may consider this preamble transmission attempt to be a failure and initiate another Msg1 transmission attempt, if needed (e.g. the number of retransmission failure does not exceed the pre-configured threshold). To receive the backoff indicator, the UE may also need to receive the RA-RNTI. Once no transmission scheduled by C-RNTI can be received successfully within the Msg1-response window, then the UE may do the back off operation according to the back off indicator received in the Msg2 scheduled by RA-RNTI.

In a second alternative, the UE monitors the RA response in Msg1-Response Window based on the calculated RA-RNTI. Once the corresponding RA response (i.e. RA response with the corresponding C-RNTI) is detected in the received Msg2, the UE considers the RA procedure successful. Otherwise, if no corresponding "C-RNTI" is detected in the received Msg2, then the UE considers the preamble transmission to be a failure and initiate another Msg1 transmission attempt, if allowed (e.g. the number of transmission attempts do not reach the maximum value). The C-RNTI in Msg2 can be either included as a separate MAC CE or as a component of the 2-step RACH MAC RAR.

Since either the contention resolution ID (i.e. first n bits of CCCH message) or the C-RNTI will be included in the Msg2 for one specific UE for the purpose of contention resolution, 1 flag bit can be included in the MAC RAR to indicate whether the contention resolution ID or C-RNTI is included in the MAC RAR. For example, Flag=0 means contention resolution ID is included in the MAC RAR or MAC subPDU; Flag=1 means C-RNTI is included in the MAC RAR or MAC subPDU.

Fallback and failure handling for 2-step RACH is discussed below. Based on different use cases and solutions, the following alternatives can be considered in the fallback and failure operation in 2-step RACH: a NACK indicator for the whole Msg1 transmission; a fallback RAR to 4-step RACH; a payload Retransmission indicator; and the UE's autonomous fallback operation.

In the first alternative, a NACK indicator for the whole Msg1 transmission is used for handling fallback and failure for the 2-step RACH. In one embodiment, one NACK indicator can be included in the Msg2 to indicate a failure reception of Msg1 for a specific RAP ID. Once the NACK indicator is received, the UE may consider the Msg1 transmission attempt a failure and initiate the Msg1 retransmission, if allowed (e.g. the maximum transmission attempt number has not been reached). The NACK indicator can be used in case the BS detects a collision on the preamble reception. When the Msg1-Response Window is longer than the RAR-window, the NACK indicator can be used to accelerate the retransmission procedure. The following content/parameters may be sent to UE in Msg2: RAP ID+Backoff Indicator (BI), where BI can be common for all UEs.

In the second alternative, a fallback RAR is used to fallback UE to 4-step RACH. In one embodiment, the BS can send the fallback RAR to UE to fallback UE to 4-step RACH. Once the fallback indicator is received by UE, the UE may fallback to 4-step RACH and transmit the Msg3 according to the received RAR. That is, the UE takes the same behavior as the Msg2 is received in a 4-step RACH procedure. For the case that the preamble can be detected successfully but the payload cannot be received successfully due to the poor radio condition, the fallback mechanism can be used to avoid the retransmission of preamble in the manner of CBRA, to accelerate the RA procedure and improve the possibility of payload reception (e.g. grant more appropriate resources). The following content/parameters may be sent to UE in Msg2: RAP ID+legacy RAR (RAR for 4-step RACH).

In the third alternative, a payload retransmission indicator is used for a specific RAP ID. In one embodiment, once the payload retransmission indicator is received by UE, the UE may process the HARQ retransmission of the payload based on the grant included in the payload transmission indicator. During the retransmission, a different redundant version (RV) can be used in the HARQ retransmission, and the RV used can either be specified in the protocol or be indicated in the Msg2. The "payload retransmission indicator" may be used in a similar scenario as the "fallback indicator", when the payload cannot be received successfully due to the poor radio condition. Compared to the operation of "fallback to 4-step RACH", the HARQ operation can be used for retransmitting the payload part of Msg1, which means the payload received at BS side can be kept in the HARQ buffer and BS can do a combined decoding with both the payload received from the initial Msg1 transmission and the payload retransmission. The following content/parameters may be sent to UE in Msg2: UL grant for retransmission, TAC (timing advance command), TC-RNTI (for the subsequent retransmission), and HARQ information if necessary (e.g. RV). The HARQ information may be merged to the UL grant information.

For the above three alternatives, the MAC sub-header or LCH ID or some flag bits in Msg2 can be used to distinguish the different feedbacks, e.g. to distinguish the fallback/failure indication from the normal feedback (e.g. successful response), or to distinguish the different fallback/failure indications from each other.

The fourth alternative is based on the UE's autonomous fallback operation. The UE autonomous fallback is triggered by some kind of counter or timer. Once the failure number of Msg1 transmission attempt reaches the pre-configured counter, the UE may fallback to 4-step RACH. This is simple to implement and has less impact on existing protocol. The following content/parameters may be sent to UE: the threshold for the counter, in RRC signaling (e.g. system information or RRC dedicated signaling).

If corresponding "fallback to 4-step RACH" or "retransmission indicator" is received, the UE may start a "contention resolution timer" after the transmission of Msg3 (using the UL grant carried in "fallback to 4-step RACH" or "retransmission indicator" within Msg2). If the contention resolution has not been made successfully based on the received Msg4 using TC-RNTI before the expiration of the timer, the UE may initiate another Msg1 transmission attempt, if allowed, e.g. when the number of Msg1 transmission attempt does not exceed (or equal) the maximum number.

While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand exemplary features and functions of the present disclosure. Such persons would understand, however, that the present disclosure is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques.

To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, module, etc. can be configured to perform one or more of the functions described herein. The term "configured to" or "configured for" as used herein with respect to a specified operation or function refers to a processor, device, component, circuit, structure, machine, module, etc. that is physically constructed, programmed and/or arranged to perform the specified operation or function.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present disclosure.

Additionally, memory or other storage, as well as communication components, may be employed in embodiments of the present disclosure. It will be appreciated that, for clarity purposes, the above description has described embodiments of the present disclosure with reference to different functional units and processors. However, it will be apparent that any suitable distribution of functionality between different functional units, processing logic elements or domains may be used without detracting from the present disclosure. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A method for wireless communication, the method comprising:
   selecting, by a wireless communication device, a preamble;
   selecting, by the wireless communication device, a payload according to the selected preamble;
   transmitting, by the wireless communication device to a wireless communication node, a first message comprising the preamble and the payload for an access to the wireless communication node;
   receiving, by the wireless communication device from the wireless communication node, a second message in response to the first message; and
   receiving, by the wireless communication device, a radio resource control (RRC) signaling for configuring a mapping between transport block (TB) sizes and payload resources, wherein for the preamble, different payload resources correspond to different TB sizes,
   wherein:
   a modulation coding scheme (MCS) is configured for the payload.

2. The method of claim 1, wherein,
a transmission resource is configured for the preamble, corresponding to the payload.

3. The method of claim 1, further comprising:
receiving, by the wireless communication device, a second RRC signaling comprising a threshold for determining whether to switch to a 4-step random access channel (RACH).

4. The method of claim 3, further comprising:
in response to a number of failure transmission attempt of the first message being larger than the threshold, switching, by the wireless communication device, to the 4-step RACH.

5. The method of claim 1, further comprising:
distinguishing, by the wireless communication device, between a 2-step RACH and a 4-step RACH based on a fixed offset defined in a protocol and added in a calculation of random access radio network temporary identifier (RA-RNTI) for transmitting the second message in the 2-step RACH compared to the 4-step RACH.

6. The method of claim 5, wherein:
the fixed offset is a multiple of 14×80×8.

7. A wireless communication device comprising:
a memory storing instructions; and
at least one processor in communication with the memory, wherein, when the at least one processor executes the instructions, the at least one processor is configured to cause the wireless communication device to:
   select a preamble;
   select a payload according to the selected preamble;
   transmit, to a wireless communication node, a first message comprising the preamble and the payload for an access to the wireless communication node;
   receive, from the wireless communication node, a second message in response to the first message; and
   receive a radio resource control (RRC) signaling for configuring a mapping between transport block (TB) sizes and payload resources, wherein for the preamble, different payload resources correspond to different TB sizes,
   wherein:
   a modulation coding scheme (MCS) is configured for the payload.

8. The wireless communication device of claim 7, wherein:
a transmission resource is configured for the preamble, corresponding to the payload.

9. The wireless communication device of claim 7, wherein, when the at least one processor executes the instructions, the at least one processor is configured to further cause the wireless communication device to:
receive a second RRC signaling comprising a threshold for determining whether to switch to a 4-step random access channel (RACH).

10. The wireless communication device of claim 9, wherein, when the at least one processor executes the instructions, the at least one processor is configured to further cause the wireless communication device to:
in response to a number of failure transmission attempt of the first message being larger than the threshold, switch to the 4-step RACH.

11. The wireless communication device of claim 7, wherein, when the at least one processor executes the instructions, the at least one processor is configured to further cause the wireless communication device to:
distinguish between a 2-step RACH and a 4-step RACH based on a fixed offset defined in a protocol and added in a calculation of random access radio network temporary identifier (RA-RNTI) for transmitting the second message in the 2-step RACH compared to the 4-step RACH.

12. The wireless communication device of claim 11, wherein:
the fixed offset is a multiple of 14×80×8.

13. A non-transitory computer program product comprising a computer-readable program medium storing instructions, wherein, the instructions, when executed by at least one processor in a wireless communication device, are configured to cause the wireless communication device to:
   select a preamble;
   select a payload according to the selected preamble;
   transmit, to a wireless communication node, a first message comprising the preamble and the payload for an access to the wireless communication node;
   receive, from the wireless communication node, a second message in response to the first message;
   receive a radio resource control (RRC) signaling for configuring a mapping between transport block (TB) sizes and payload resources, wherein for the preamble, different payload resources correspond to different TB sizes,
   wherein:
   a modulation coding scheme (MCS) is configured for the payload.

14. The non-transitory computer program product according to claim 13, wherein:
a transmission resource is configured for the preamble, corresponding to the payload.

15. The non-transitory computer program product according to claim 13, wherein the instructions, when executed by the at least one processor, are configured to further cause the wireless communication device to:

receive a second RRC signaling comprising a threshold for determining whether to switch to a 4-step random access channel (RACH).

16. The non-transitory computer program product according to claim 15, wherein the instructions, when executed by the at least one processor, are configured to further cause the wireless communication device to:

in response to a number of failure transmission attempt of the first message being larger than the threshold, switch to the 4-step RACH.

17. The non-transitory computer program product according to claim 13, wherein the instructions, when executed by the at least one processor, are configured to further cause the wireless communication device to:

distinguish between a 2-step RACH and a 4-step RACH based on a fixed offset defined in a protocol and added in a calculation of random access radio network temporary identifier (RA-RNTI) for transmitting the second message in the 2-step RACH compared to the 4-step RACH, wherein the fixed offset is a multiple of 14×80×8.

* * * * *